United States Patent
Shimamura et al.

(10) Patent No.: US 8,684,844 B2
(45) Date of Patent: Apr. 1, 2014

(54) GAME SYSTEM, GAME PROCESSING METHOD, COMPUTER-READABLE STORAGE MEDIUM HAVING STORED THEREIN GAME PROGRAM, AND GAME APPARATUS

(75) Inventors: Takayuki Shimamura, Kyoto (JP); Jun Ito, Kyoto (JP); Takeshi Hosono, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 13/608,268

(22) Filed: Sep. 10, 2012

(65) Prior Publication Data

US 2013/0244740 A1    Sep. 19, 2013

(30) Foreign Application Priority Data

Mar. 14, 2012    (JP) ................................. 2012-056622

(51) Int. Cl.
*A63F 9/24*    (2006.01)

(52) U.S. Cl.
USPC .............................................. 463/42; 463/31

(58) Field of Classification Search
USPC ........................................................ 463/25–43
See application file for complete search history.

(56) References Cited

U.S. PATENT DOCUMENTS

| 8,052,527 B2 * | 11/2011 | Kawase et al. .................. 463/31 |
| 2008/0227543 A1 * | 9/2008 | Kawase et al. .................. 463/31 |
| 2010/0035686 A1 * | 2/2010 | Nakashima ...................... 463/36 |
| 2011/0077078 A1 * | 3/2011 | Taoka et al. ..................... 463/31 |

FOREIGN PATENT DOCUMENTS

JP    2011-200733    10/2011

* cited by examiner

*Primary Examiner* — Masud Ahmed
(74) *Attorney, Agent, or Firm* — Nixon & Vanderhye P.C.

(57) ABSTRACT

A plurality of players operate player characters using controllers. The player characters form a friend team to attack enemy characters. The player characters make attacks on the enemy characters by firing bullets into a game space using guns, in accordance with the operations of the respective players. If one of the player characters attacks another one of the player characters, a life of the attacked player character decreases, and a life item for restoring a life also appears in the game space. The attacked player character can restore a life by acquiring the life item.

21 Claims, 11 Drawing Sheets

F I G. 7
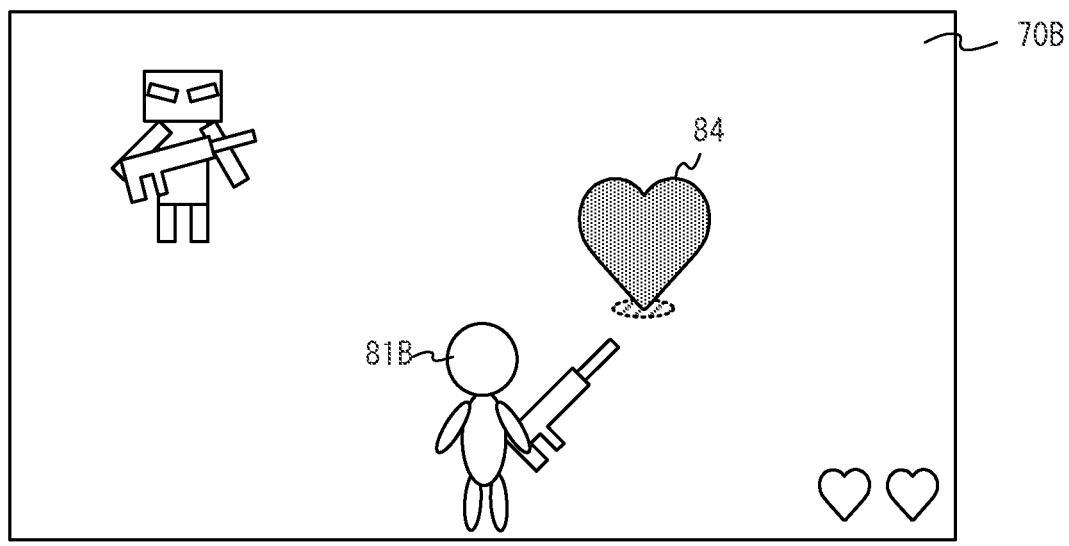
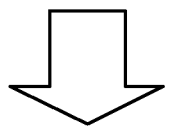
CERTAIN TIME ELAPSES
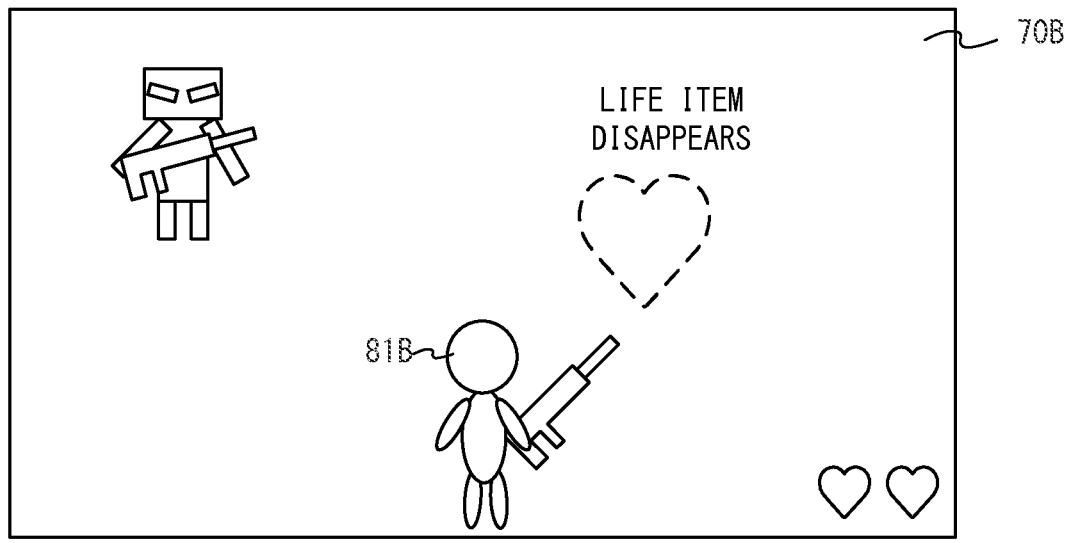

F I G. 1 3
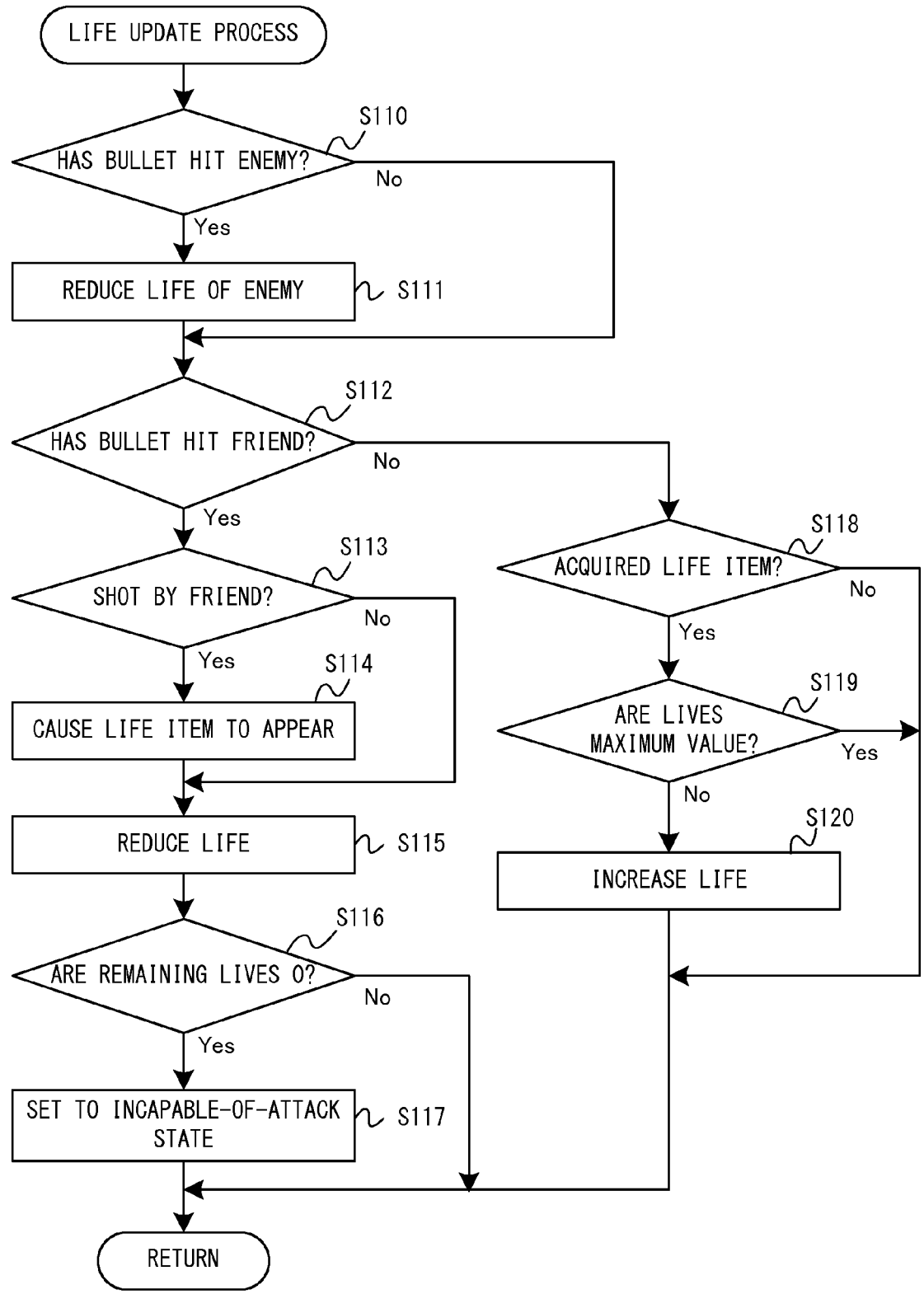

GAME SYSTEM, GAME PROCESSING METHOD, COMPUTER-READABLE STORAGE MEDIUM HAVING STORED THEREIN GAME PROGRAM, AND GAME APPARATUS

CROSS REFERENCE TO RELATED APPLICATION

The disclosure of Japanese Patent Application No. 2012-056622, filed on Mar. 14, 2012, is incorporated herein by reference.

FIELD

The technique disclosed herein relates a game system, a game processing method, and a game apparatus that can be played by a plurality of players, and a computer-readable storage medium having stored therein a game program that can be played by a plurality of players.

BACKGROUND AND SUMMARY

Conventionally, there is a game where a plurality of players cooperate to defeat enemy characters. For example, in the conventional game performed by a plurality of players, player characters each have lives (a physical strength value), so that, if the player character is attacked by one of the enemy characters, a life of the player character decreases.

In the conventional game, however, if an attack made by one of the player characters hits another one of the player characters, a life of the other player character decreases. Thus, for example, a player whose player character has been attacked may have a feeling of discomfort. Consequently, there is room for improvement in a plurality of players playing a game while cooperating with each other.

Therefore, it is an object of an exemplary embodiment to provide a novel game as a game that a plurality of players play while cooperating with each other.

To achieve the object, the exemplary embodiment employs the following configurations.

An exemplary embodiment is a game system for executing a game played by a plurality of players. The game system includes a player object setting unit, a friend setting unit, an enemy setting unit, a life setting unit, and a game processing unit. The player object setting unit sets, for each player, a player object to be operated by the player. The friend setting unit sets a friend team including a plurality of player objects among the player objects. The enemy setting unit sets an enemy object that serves as an enemy of the friend team. The life setting unit sets a life for each player object. The game processing unit performs game processing in a virtual space on the basis of operations of the players. The game processing unit includes a movement process unit, an attack execution unit, a first damage process unit, a second damage process unit, a friend attack process unit, and a restoration process unit. The movement process unit, in accordance with an operation of each player, causes the corresponding player object to move. The attack execution unit, in accordance with an operation of the player, causes the player object to make an attack. The first damage process unit damages the enemy object in accordance with an attack made on the enemy object by the player object. The second damage process unit performs subtraction on the life of the player object in accordance with an attack made on the player object by the enemy object. The friend attack process unit, when another one of the player objects on the friend team has attacked the player object, performs subtraction on the life of the attacked player object, and causes a restoration object for restoring the life to appear in the virtual space. The restoration process unit, under a condition that any one of the player objects on the friend team has acquired the restoration object, restores the life of the player object having acquired the restoration object.

On the basis of the above, in accordance with an attack made on an enemy object by a player object, subtraction is performed on the life of the enemy object. Further, when the player object has attacked another player object, it is possible to perform subtraction on the life of the attacked player object, and also cause a restoration object for restoring the life to appear. Thus, in a game where a plurality of players cooperate to defeat enemies, the players can further enjoy the game while cooperating with each other.

In addition, in another configuration, when the player object attacked by the other player object on the friend team has acquired the restoration object, the restoration process unit may restore the life of the player object.

On the basis of the above, it is possible to restore the life of a player object attacked by another player object on the friend team. Even when a player object operated by a player has accidentally attacked another player object operated by another player, it is possible to restore the life of the attacked player object. This enables the player operating the attacked player object and the player operating the player object having made the attack to continuously enjoy the game thereafter.

In addition, in another configuration, the game processing unit may further include a state change unit and a recovery process unit. The state change unit, when the life of the player object has become a predetermined value or less, changes a state of the player object to an incapable-of-attack state where the movement process unit is capable of causing the player object to move, but the attack execution unit is incapable of causing the player object to make an attack. The recovery process unit, when the player object in the incapable-of-attack state has acquired the restoration object, restores the life and recovering the player object to a state where the attack execution unit is capable of causing the player object to make an attack.

On the basis of the above, a player object in an incapable-of-attack state acquires the restoration object, and thereby can return to the game. This makes it possible to advance the game while causing the players to further cooperate with each other.

In addition, in another configuration, the game processing unit may further include an object generation unit for, when the player object is in the incapable-of-attack state, generating a predetermined object from the player object.

On the basis of the above, the player object in the incapable-of-attack state can inform the players operating the other player objects of the position of the player object itself, and inform the other players of the position of the enemy object.

In addition, in another configuration, the friend attack process unit may cause the restoration object to appear at a position, in the virtual space, determined on the basis of the attacked player object.

On the basis of the above, it is possible to cause the restoration object to appear at a position determined on the basis of a player object attacked by another player object on the friend team. For example, the restoration object is caused to appear at or near the position where the player object has been attacked, whereby the player object attacked by the other player object on the friend team can immediately restore the life.

In addition, in another configuration, the game processing unit may further include a defeat process unit for, when the lives of the player objects on the friend team have satisfied a predetermined condition, determining a defeat of the friend team.

On the basis of the above, it is possible to provide a game where a plurality of players form teams so that victory or defeat is determined for each team. This makes it possible to provide a game that place more importance on the cooperation of the players.

In addition, in another configuration, all the player objects may belong to the friend team, and the enemy object may be automatically controlled by the game system.

On the basis of the above, it is possible to provide a game where all the players attempt to defeat the enemy object automatically controlled by the game system.

In addition, in another configuration, the attack execution unit may cause the player object to make an attack on a position pointed to in accordance with the operation of the player.

On the basis of the above, it is possible to make an attack on the position pointed to by a player.

In addition, in another configuration, the friend setting unit may divide the player objects into a plurality of teams so as to set at least one friend team and at least one enemy team. The player objects on the enemy team serve as the enemy object.

On the basis of the above, it is possible to provide a game where a team formed of a plurality of players competes against a team formed of other players. This makes it possible to provide a game that places more importance on teamwork.

In addition, another exemplary embodiment is a game system for executing a game played by a plurality of players. The game system includes a player object setting unit, a friend setting unit, an enemy setting unit, a parameter setting unit, and a game processing unit. The player object setting unit sets, for each player, a player object to be operated by the player. The friend setting unit sets a friend team including a plurality of player objects among the player objects. The enemy setting unit sets an enemy object that serves as an enemy of the friend team. The parameter setting unit sets a predetermined parameter for each player object. The game processing unit performs game processing in a virtual space on the basis of operations of the players The game processing unit includes a movement process unit, an action execution unit, a determination unit, a first parameter process unit, a second parameter process unit, a friend action process unit, and a restoration process unit. The movement process unit, in accordance with an operation of each player, causes the corresponding player object to move. The action execution unit, in accordance with an operation of the player, causes the player object to take a predetermined action. The determination unit determines whether or not the predetermined action of the player object based on the action execution unit has been taken on the enemy object or another one of the player objects. The first parameter process unit changes a predetermined parameter of the enemy object in accordance with the predetermined action of the player object taken on the enemy object. The second parameter process unit changes the predetermined parameter of the player object in accordance with a predetermined action of the enemy object taken on the player object. The friend action process unit, when another one of the player objects on the friend team has taken the predetermined action on the player object, changes the predetermined parameter of the player object on which the predetermined action has been taken, and causes a restoration object for restoring the predetermined parameter to appear in the virtual space. The restoration process unit, under a condition that any one of the player objects on the friend team has acquired the restoration object, restores the predetermined parameter of the player object having acquired the restoration object.

It should be noted that another exemplary embodiment may be a game processing method to be performed by the game system, or may be a program to be executed by the game system, or may be a game apparatus for executing the game.

On the basis of the exemplary embodiment, in a game that a plurality of players play while cooperating with each other, the players can perform the game while further cooperating with each other.

These and other objects, features, aspects and advantages of the exemplary embodiment will become more apparent from the following detailed description of the exemplary embodiment when taken in conjunction with the accompanying drawings.

BRIEF DESCRIPTION OF THE DRAWINGS

FIG. 7 is a diagram showing a non-limiting example of the state where the life item 84 disappears after a certain time has elapsed;

FIG. 13 is a flow chart showing a non-limiting example of a detailed flow of a life update process (step S104) shown in FIG. 12.

DETAILED DESCRIPTION OF NON-LIMITING EXAMPLE EMBODIMENTS (Example of Configuration of Game System)

Figure 1:
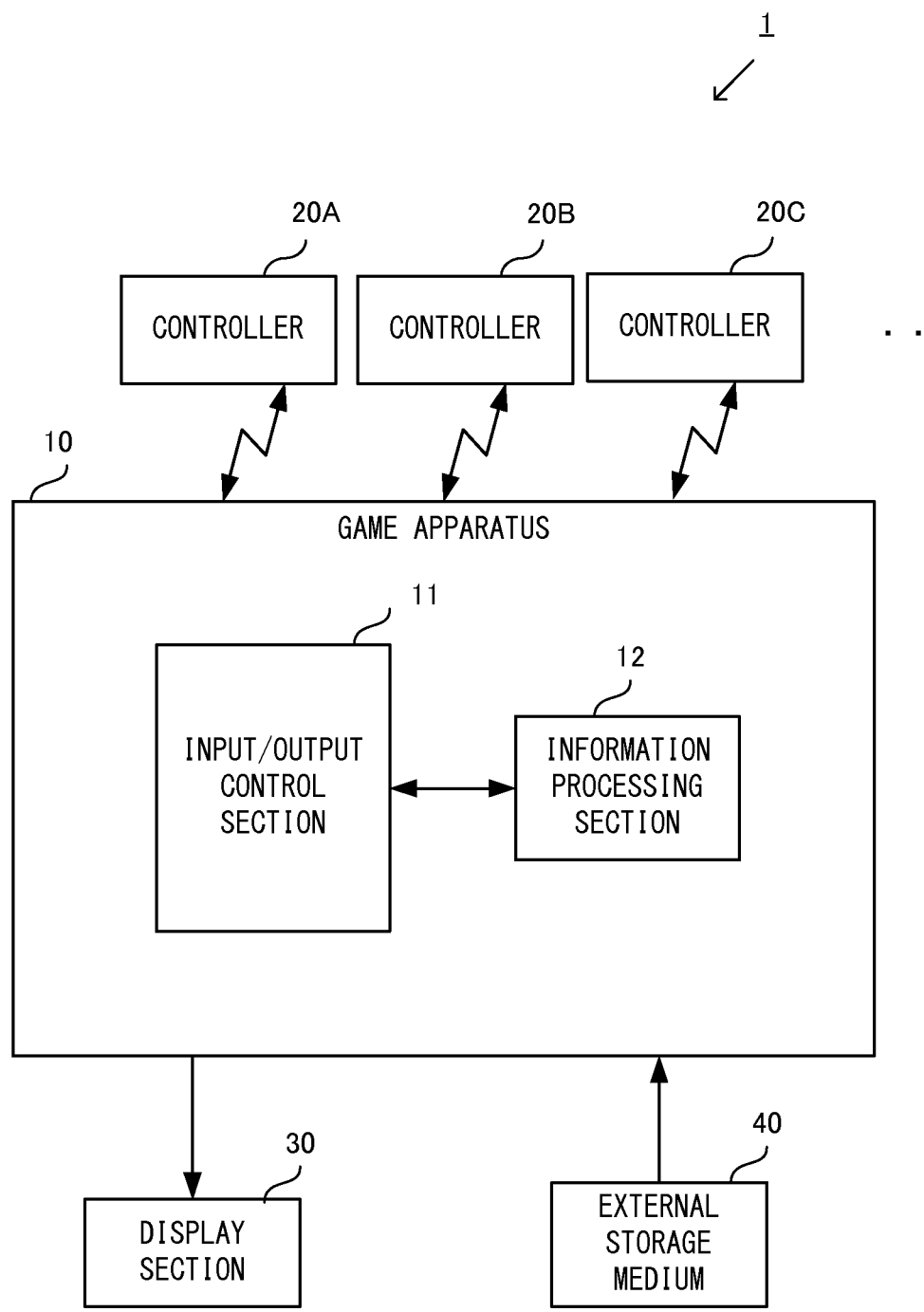
FIG. 1 is a block diagram showing a non-limiting example of the configuration of a game apparatus 10.

With reference to the drawings, a game system 1 according to an exemplary embodiment is described below. FIG. 1 is a block diagram showing an example of the configuration of the game system 1. As shown in FIG. 1, the game system 1 includes a game apparatus 10, controllers 20 (20A, 20B, 20C, and the like), a display section 30, and an external storage medium 40. Further, the game apparatus 10 includes an input/output control section 11 and an information processing section 12. The game apparatus 10 is connected to the plurality of controllers 20 using a wireless or wired connection.

Each controller 20 is operated by a player, and transmits operation data based on the operation of the player to the game apparatus 10. The controller 20 includes an operation section. The operation section of the controller 20 includes an operation button for making an attack described later, a direction indication section for indicating the moving direction of a player character, and the like. The controller 20 also functions as a pointing device for indicating a position on a screen of the display section 30. The pointing of the controller 20 to the screen may be performed using a known technique. For example, the controller 20 may receive infrared light from a light-emitting section placed around the display section 30, thereby pointing to a position on the screen.

The information processing section 12 includes a CPU that performs game processing described later, a memory, and a GPU that generates a game image to be output to the display section 30. The information processing section 12 loads a game program stored in the external storage medium 40 (for example, a non-volatile memory) into the memory, and executes the program, thereby performing the game processing described later. For example, the information processing section 12 acquires operation data (data representing information of the operation performed on the operation button, data representing the position pointed to, and the like) from each controller 20 via the input/output control section 11, and performs the game processing on the basis of the acquired operation data. Then, the information processing section 12 outputs a game image and a game sound that result from the game processing to the display section 30 via the input/output control section 11. The display section 30 may be, for example, a television receiver or a dedicated display apparatus.

It should be noted that the game system 1 shown in FIG. 1 is merely illustrative, and the game processing described later may be performed by any apparatus.

(Overview of Game Processing)

Next, a description is given of an overview of the game processing performed by the game system 1 according to the exemplary embodiment. A game according to the exemplary embodiment is performed by a plurality of players. Specifically, the game apparatus 10 is connected to a plurality of controllers 20, so that each player operates the corresponding controller 20 to control their player character (player object). It should be noted that, in the game according to the exemplary embodiment, up to four controllers 20 can be connected to the game apparatus 10.

Hereinafter, the game according to the exemplary embodiment is described on the assumption that a player A operates a controller 20A, a player B operates a controller 20B, a player C operates a controller 20C, and a player D operates a controller 20D.

Figure 2:
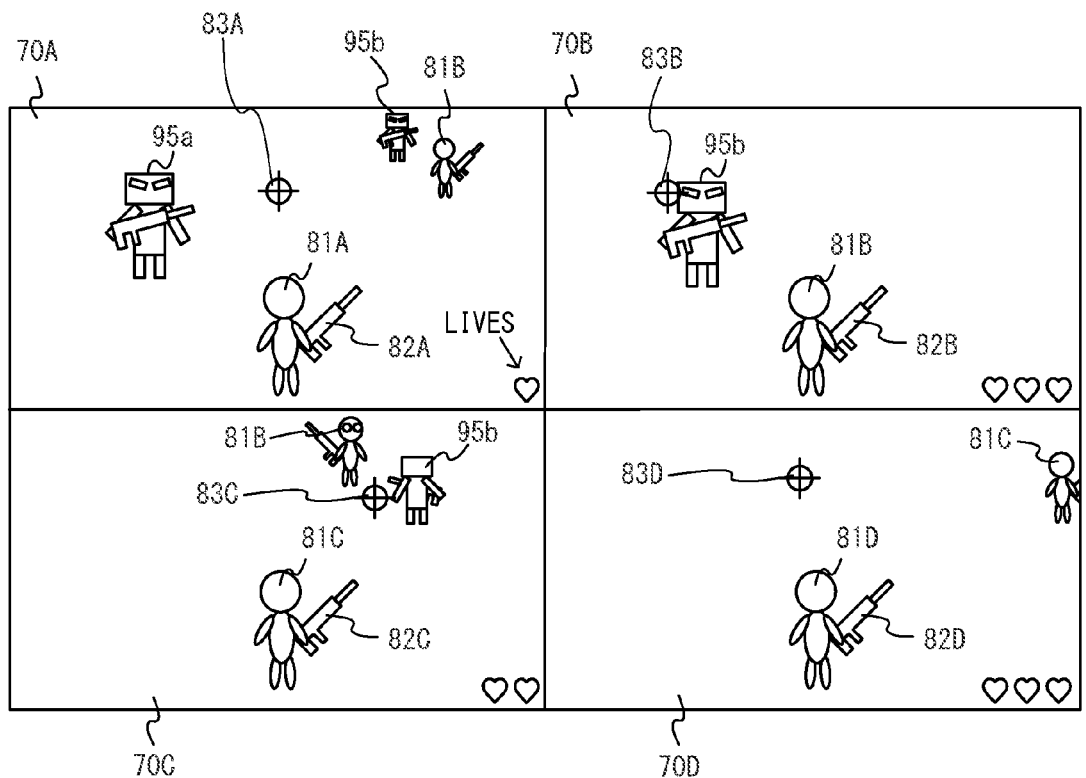
FIG. 2 is a diagram showing a non-limiting example of a game image displayed on a display section 30.

FIG. 2 is a diagram showing an example of a game image displayed on the display section 30. As shown in FIG. 2, the screen of the display section 30 is divided into four equal areas, so that an image 70A, an image 70B, an image 70C, and an image 70D are displayed in the respective divided areas. As shown in FIG. 2, on the display section 30, a player character 81A, a player character 81B, a player character 81C, and a player character 81D are displayed. Further, on the display section 30, a plurality of enemy characters 95 (95a, 95b, and the like) are also displayed.

The player character 81A is a virtual character placed in a game space (a three-dimensional (or two-dimensional) virtual world), and is operated by the player A using the controller 20A. The player character 81A makes an attack on the enemy characters 95 by shooting a bullet using a gun object 82A. The player character 81B is a virtual character placed in the game space, and is operated by the player B using the controller 20B. The player character 81C is a virtual character placed in the game space, and is operated by the player C using the controller 20C. The player character 81D is a virtual character placed in the game space, and is operated by the player D using the controller 20D. The player character 81B, the player character 81C, and the player character 81D make attacks on the enemy characters 95 by shooting bullets using gun objects 82B through 82D, respectively.

As shown in FIG. 2, in the upper left area of the screen of the display section 30, the image 70A including the player character 81A is displayed, so that the player A operates the player character 81A while viewing the image 70A. In the image 70A, an aim 83A is displayed that is used when the player character 81A attacks the enemy characters 95. In the upper right area of the screen of the display section 30, the image 70B including the player character 81B is displayed, so that the player B operates the player character 81B while viewing the image 70B. In the image 70B, an aim 83B is displayed that is used when the player character 81B attacks the enemy characters 95. In the lower left area of the screen of the display section 30, the image 70C including the player character 81C is displayed, so that the player C operates the player character 81C while viewing the image 70C. In the image 70C, an aim 83C is displayed that is used when the player character 81C attacks the enemy characters 95. In the lower right area of the screen of the display section 30, the image 70D including the player character 81D is displayed, so that the player D operates the player character 81D while viewing the image 70D. In the image 70D, an aim 83D is displayed that is used when the player character 81D attacks the enemy characters 95.

Figure 3:
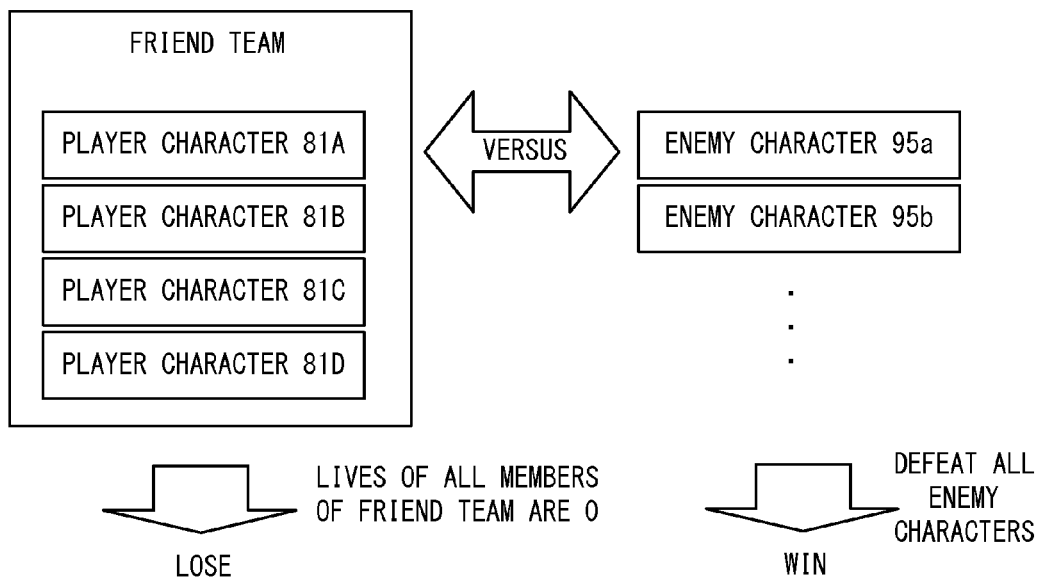
FIG. 3 is a diagram illustrating a non-limiting example of an overview of a game according to an exemplary embodiment.

The enemy characters 95 are virtual characters controlled by the game apparatus 10, and make attacks on the player characters 81 by firing bullets at them while moving in the game space. The object of the game according to the exemplary embodiment is for the players A through D to cooperate to defeat the enemy characters 95. FIG. 3 is a diagram illustrating an overview of the game according to the exemplary embodiment. As shown in FIG. 3, in the game according to the exemplary embodiment, the players A through D form a friend team and cooperate with each other to defeat the enemy characters 95. In the exemplary embodiment, each player character 81 initially has three lives, so that one life decreases if the player character 81 is hit by a bullet from any one of the enemy characters 95. The lives are a parameter that allows the attack of the player character 81. If the number of the lives of the player character 81 becomes 0, the player character 81 cannot make an attack, and therefore cannot participate in the game in the sense of attacking the enemy characters 95 (the player character 81 is ejected from the game). If the numbers of the lives of all the members of the friend team become 0, the friend team loses, and the game ends. If the friend team defeats all the enemy characters 95 before the numbers of the lives of all the members of the friend team become 0, the friend team wins. It should be noted that, as shown in FIG. 2, the number of the remaining lives of each player character 81 may be displayed on the display section 30. For example, in the lower right region of the image 70A, an image representing the number of remaining lives is displayed. In the example shown in FIG. 2, the number of the remaining lives of the player character 81A is one. Further, as shown in FIG. 2, the numbers of the remaining lives of the player character 81B and the player character 81D are three, and the number of the remaining lives of the player character 81C is two.

Figure 4A:
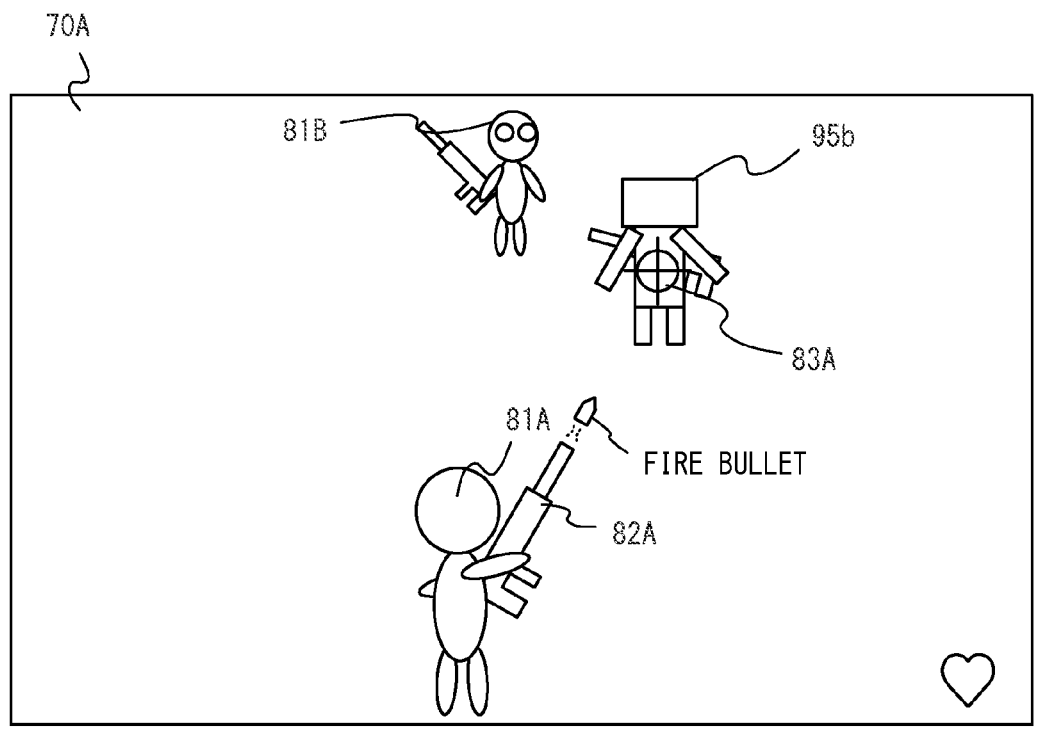
FIG. 4A is a diagram showing a non-limiting example of an image displayed on the display section 30 immediately before a player character 81A attacks an enemy character 95*b*.
Figure 4B:
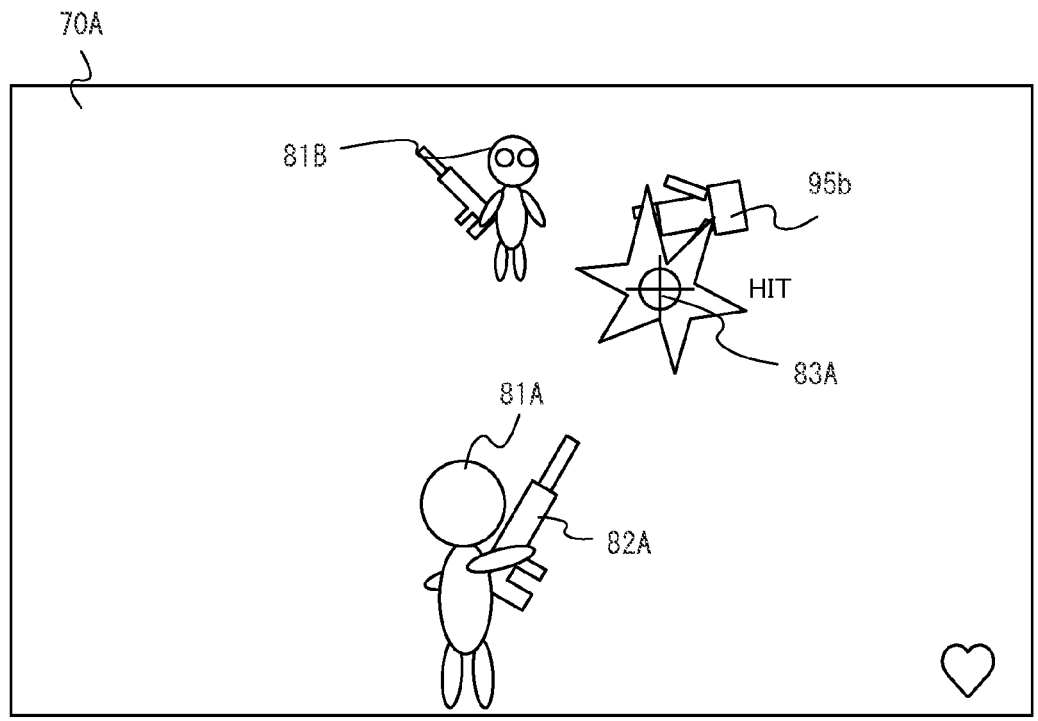
FIG. 4B is a diagram showing a non-limiting example of an image displayed on the display section 30 after the player character 81A has attacked the enemy character 95*b*.

FIG. 4A is a diagram showing an example of an image displayed on the display section 30 immediately before the player character 81A attacks the enemy character 95b. FIG. 4B is a diagram showing an example of an image displayed on the display section 30 after the player character 81A has attacked the enemy character 95b. As shown in FIG. 4A, the player A directs the controller 20A toward the screen so as to point to a position on the screen, thereby placing the aim 83A on the enemy character 95b, and then presses the operation button of the controller 20A for firing a bullet. As a result, a bullet is fired at the position, in the game space, indicated by the aim 83A from the position of the player character 81A (the gun object 82A). As shown in FIG. 4B, if the bullet fired into the game space hits the enemy character 95b, the enemy character 95b is damaged. If bullets hit the enemy character 95b predetermined times, the enemy character 95b falls down.

Figure 5A:
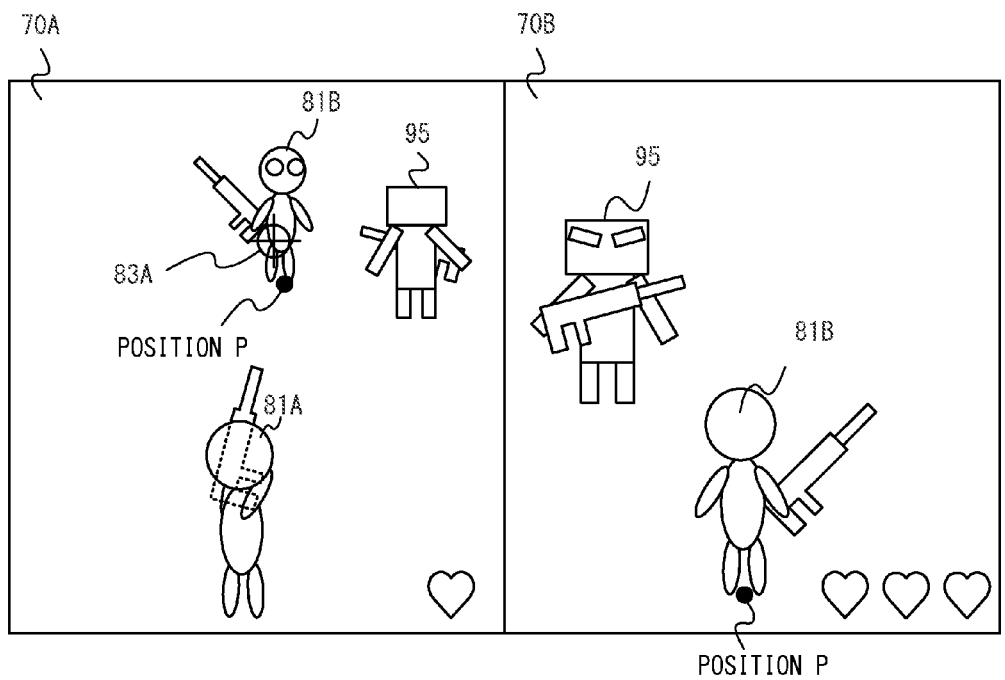
FIG. 5A is a diagram showing a non-limiting example of an image displayed on the display section 30 immediately before the player character 81A attacks a player character 81B.
Figure 5B:
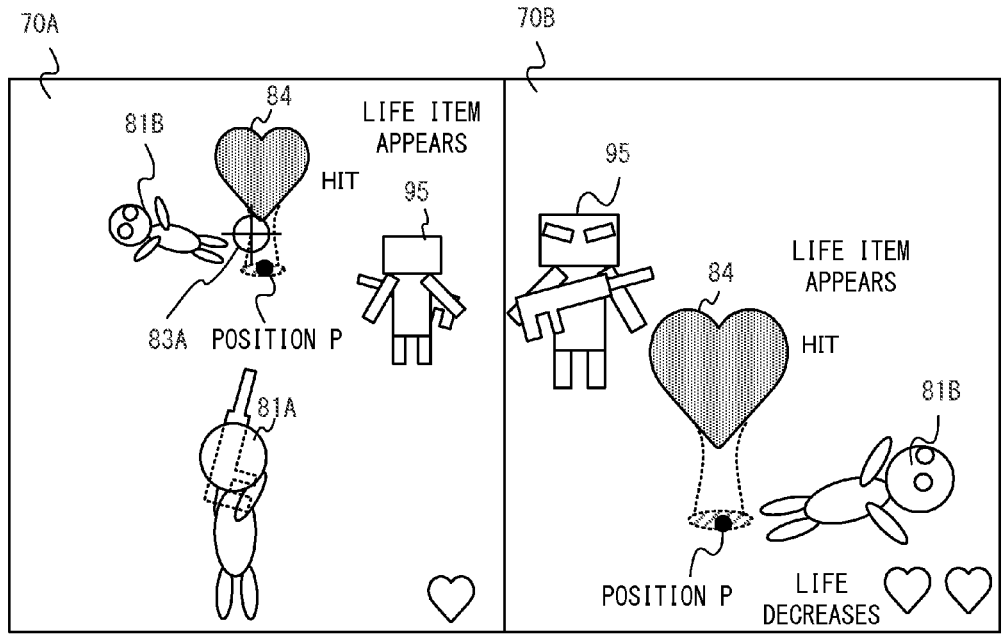
FIG. 5B is a diagram showing a non-limiting example of an image displayed on the display section 30 after the player character 81A has attacked the player character 81B.

Here, a description is given of the case where a bullet fired by one of the player characters 81 has hit another one of the player characters 81 that is a member of the friend team. FIG. 5A is a diagram showing an example of an image displayed on the display section 30 immediately before the player character 81A attacks the player character 81B. FIG. 5B is a diagram showing an example of an image displayed on the display section 30 after the player character 81A has attacked the player character 81B. It should be noted that FIGS. 5A and 5B show only the image 70A displayed in the upper left of the screen and the image 70B displayed in the upper right of the screen, and the other images (70C and 70D) are omitted. Further, in FIGS. 5A and 5B, only central regions of the image 70A and the image 70B are displayed, and the end regions of the image 70A and the image 70B are not displayed.

As shown in FIG. 5A, the aim 83A indicating the position on which the player character 81A is to make an attack is located in the display region of the player character 81B (the image 70A), and the number of the remaining lives of the player character 81B is three at this time (the image 70B). In this case, if the player A accidentally (or intentionally) presses the operation button for making an attack, a bullet is fired at the aim 83A (the player character 81B) from the gun object 82A held by the player character 81A. Then, as shown in FIG. 5B, if the bullet fired by the player character 81A hits the player character 81B, the number of the lives of the player character 81B decreases by one (the number of the remaining lives of the player character 81B becomes two), and a life item 84 also appears in the game space. The life item 84 is a virtual object for restoring a life of each player character 81. If one of the player characters 81 is attacked by another one of the player characters 81 on the friend team, the life item 84 appears at a position determined on the basis of a position P (in a predetermined range including the position P) of the player character 81 when attacked. For example, the life item 84 appears at the position P of the player character 81 when attacked. It should be noted that, if the attack of the player character 81A further hits the player character 81B, the number of the lives of the player character 81B further decreases by one (the number of the remaining lives of the player character 81B becomes one), and another life item 84 also appears in the game space.

As shown in FIG. 5B, even if a bullet hits the player character 81B and the number of their lives decreases, the number of their remaining lives is two. This allows the player character 81B to continuously perform the game (make an attack on the enemies). That is, the attacked player character 81B stands up again after a predetermined time elapses since it was attacked, and then becomes capable of moving in the game space and also capable of making an attack on the enemy characters 95.

Figure 6A:
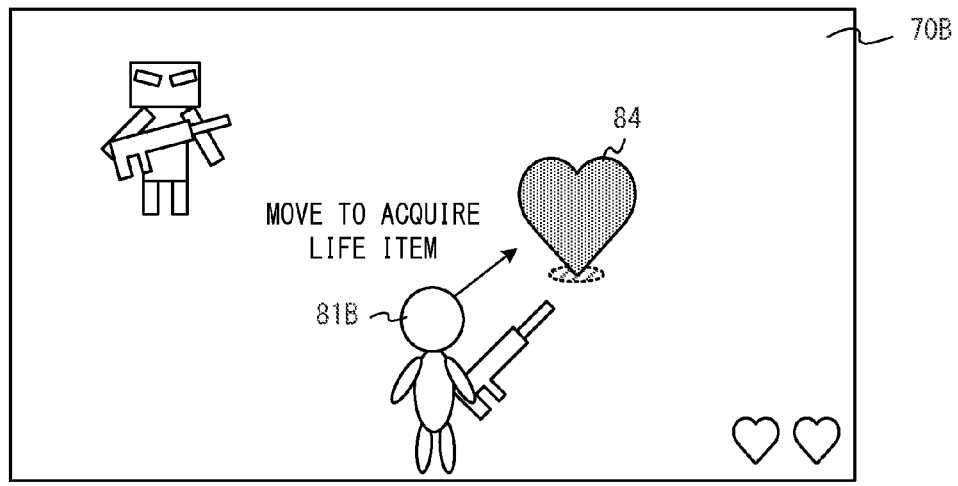
FIG. 6A is a diagram showing a non-limiting example of the state where the player character 81B attacked by another player character on a friend team moves toward a life item 84.
Figure 6B:
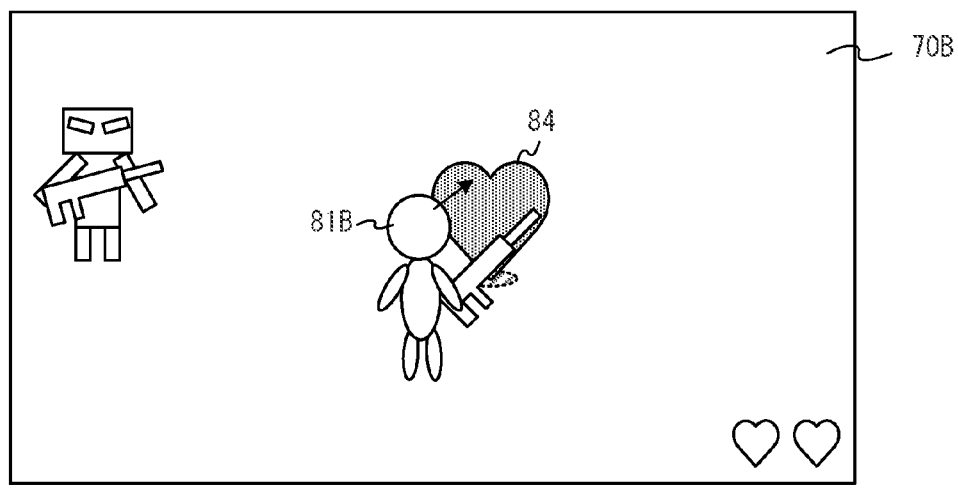
FIG. 6B is a diagram showing a non-limiting example of the state immediately before the player character 81B attacked by the other player character on the friend team acquires the life item 84.
Figure 6C:
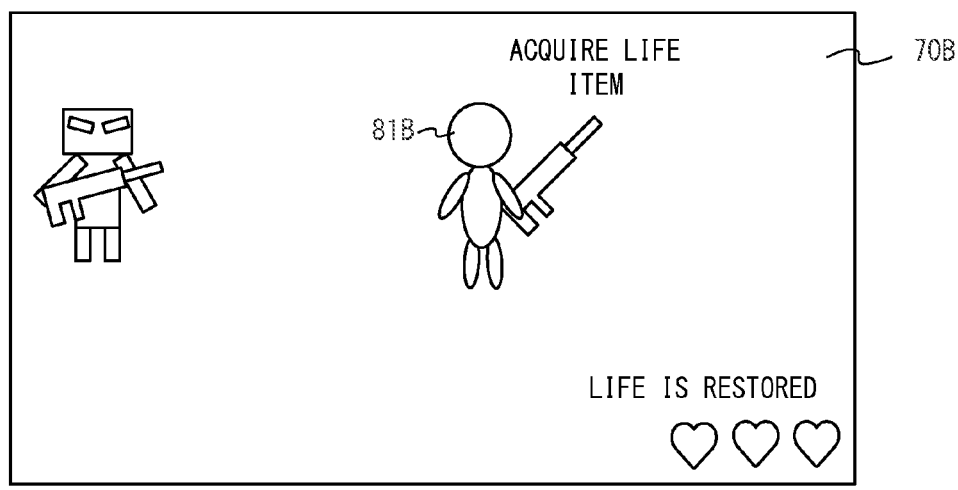
FIG. 6C is a diagram showing a non-limiting example of the state after the player character 81B attacked by the other player character on the friend team has acquired the life item 84.

The player character 81B attacked by another one of the player characters on the friend team can restore a life by acquiring the life item 84 having appeared in the game space. FIG. 6A is a diagram showing the state where the player character 81B attacked by another one of the player characters on the friend team moves toward the life item 84. FIG. 6B is a diagram showing an image immediately before the player character 81B attacked by the other player character on the friend team acquires the life item 84. FIG. 6C is a diagram showing the state after the player character 81B attacked by the other player character on the friend team has acquired the life item 84. As shown in FIGS. 6A and 6B, the number of the remaining lives of the player character 81B is two before the player character 81B acquires the life item 84. As shown in FIG. 6C, if the player character 81B moves to the position of the life item 84 (the display region of the life item 84), the player character 81B acquires the life item 84. As a result, the lives of the player character 81B increase from two to three. As described above, the player character 81B whose lives have decreased because it has been attacked by the other player character on the friend team can restore a life by acquiring the life item 84.

It should be noted that the life item 84 disappears after a certain time elapses since its appearance. FIG. 7 is a diagram showing the state where the life item 84 disappears after a certain time has elapsed. As shown in FIG. 7, the life item 84 having appeared in the game space disappears after a certain time elapses since the appearance.

Figure 8A:
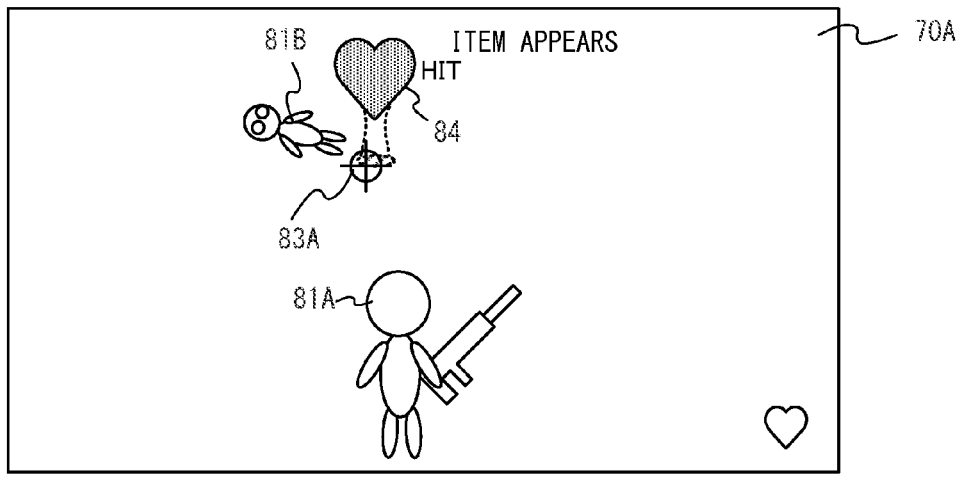
FIG. 8A is a diagram showing a non-limiting example of the state where the player character 81A has accidentally (or intentionally) attacked the player character 81B and the life item 84 appears.
Figure 8B:
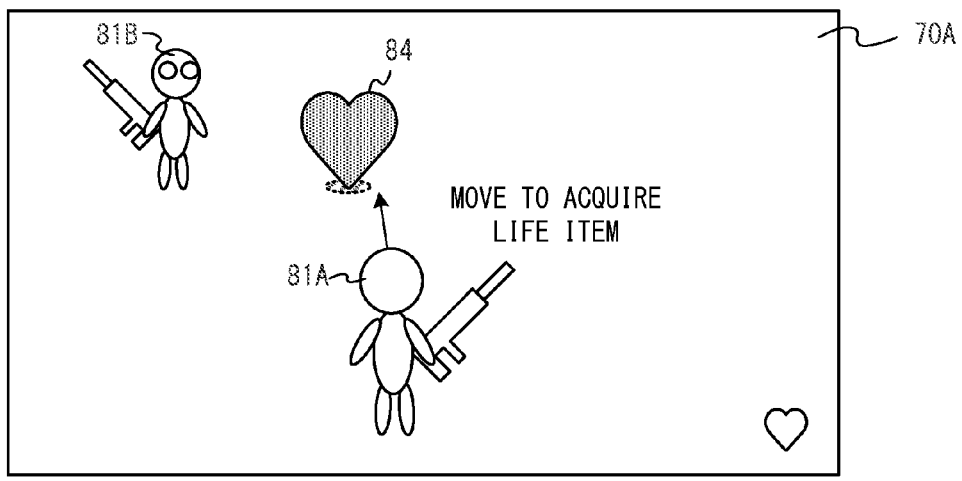
FIG. 8B is a diagram showing a non-limiting example of the state where the player character 81A moves toward the life item 84 having appeared.
Figure 8C:
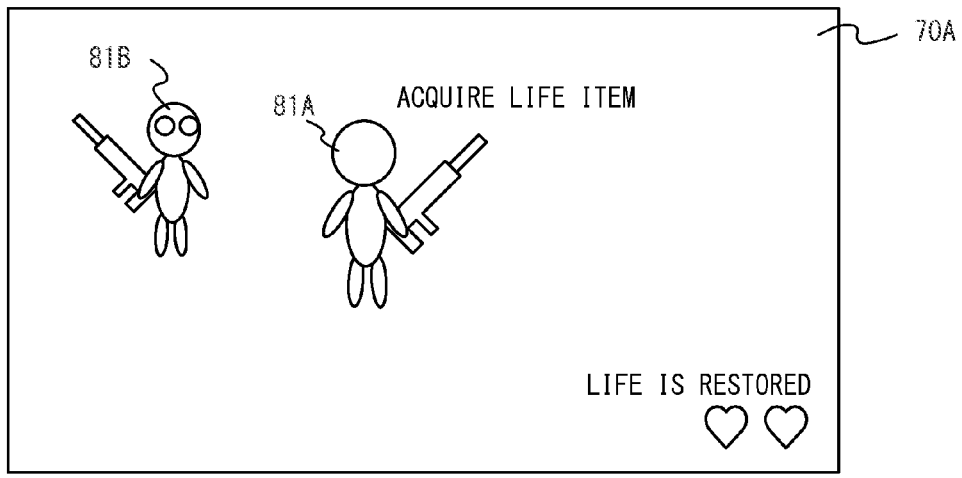
FIG. 8C is a diagram showing a non-limiting example of the state after the player character 81A having made the attack has acquired the life item 84.

The player characters 81 other than the player character 81 attacked by the other player character on the friend team can also acquire the life item 84. FIG. 8A is a diagram showing the state where the player character 81A has accidentally (or intentionally) attacked the player character 81B and the life item 84 appears. FIG. 8B is a diagram showing the state where the player character 81A having made the attack moves toward the life item 84 having appeared. FIG. 8C is a diagram showing the state after the player character 81A having made the attack has acquired the life item 84.

As shown in FIG. 8A, if the player character 81A attacks the player character 81B, the life item 84 appears. As shown in FIGS. 8A and 8B, the number of the lives of the player character 81A having made the attack is one before the player character 81A acquires the life item 84. In this case, if the player character 81A acquires the life item 84 having appeared as a result of the player character 81A attacking the player character 81B, the number of the lives of the player character 81A increases by one. That is, a life of each player character 81 is restored not only when the player character 81 has acquired the life item 84 having appeared as a result of the player character 81 itself being attacked by another one of the player characters 81 on the friend team, but also when the player character 81 has acquired the life item 84 having appeared as a result of the player character 81 itself attacking another one of the player characters 81 on the friend team. It should be noted that the maximum value of the lives of each player character 81 is set to three. Thus, even if one of the player characters 81 whose lives are the maximum value acquires the life item 84, the number of their lives does not increase although the life item 84 disappears.

As described above, any one of the player characters 81 different from another one of the player characters 81 having been attacked can restore a life by acquiring the life item 84. This enables, for example, one of the player characters 81 to intentionally allow another one of the player characters 81 on the friend team to shoot the player character 81 itself, thereby causing the life item 84 to appear, and then allow the other player character 81 having made the attack to restore a life by acquiring the life item 84. Alternatively, the player character 81A can attack the player character 81B, thereby causing the life item 84 to appear, so that the player character 81C can acquire the life item 84. This makes it possible to cooperate with other players to compete against enemy characters, while giving lives to other player characters.

It should be noted that, if the number of the lives of one of the player characters 81 becomes 0, the player character 81 enters the state of being capable of moving in the game space but incapable of making an attack (an incapable-of-attack state). The player character 81 in the incapable-of-attack state can, instead of being capable of firing a bullet, generate an object (a predetermined object visible to the players) that does not affect any lives, regardless of whether it is the enemies or the friends. For example, the player character 81 in the incapable-of-attack state can generate an object representing an electrical wave. By generating an electrical wave, the player character 81 in the incapable-of-attack state can inform the other player characters 81 of the position of the player character 81 itself, and inform the other player characters 81 of the positions of the enemy characters.

Figure 9A:
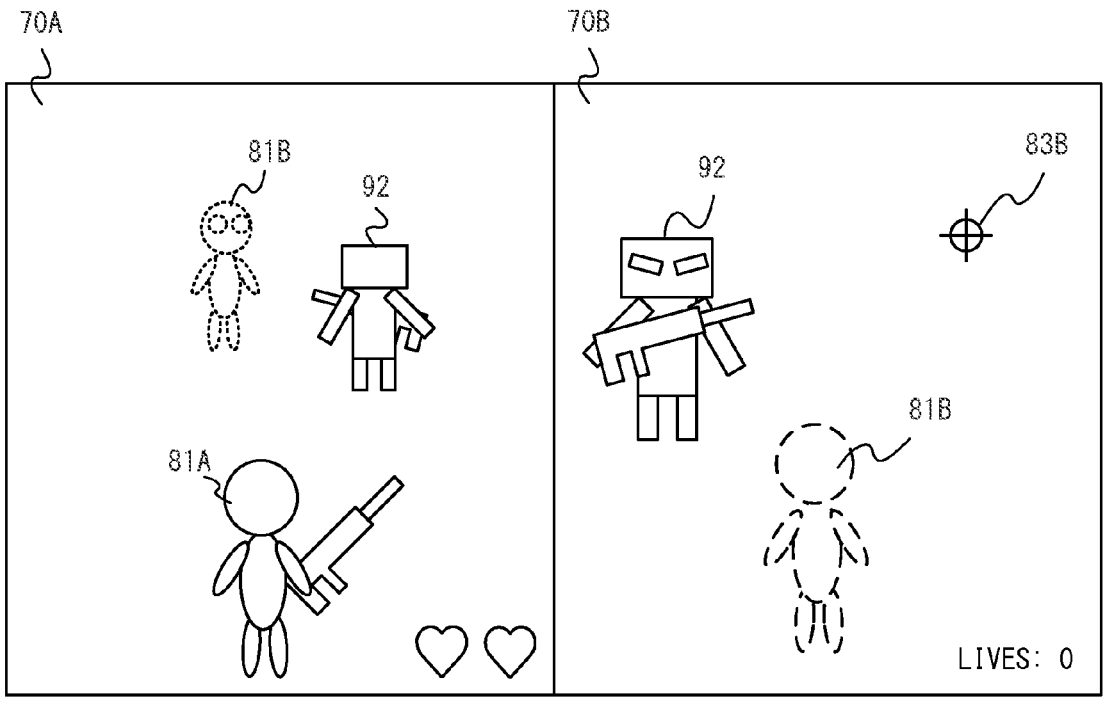
FIG. 9A is a diagram showing a non-limiting example of a game image when the number of the lives of the player character 81B has become 0 and the player character 81B has entered an incapable-of-attack state.
Figure 9B:
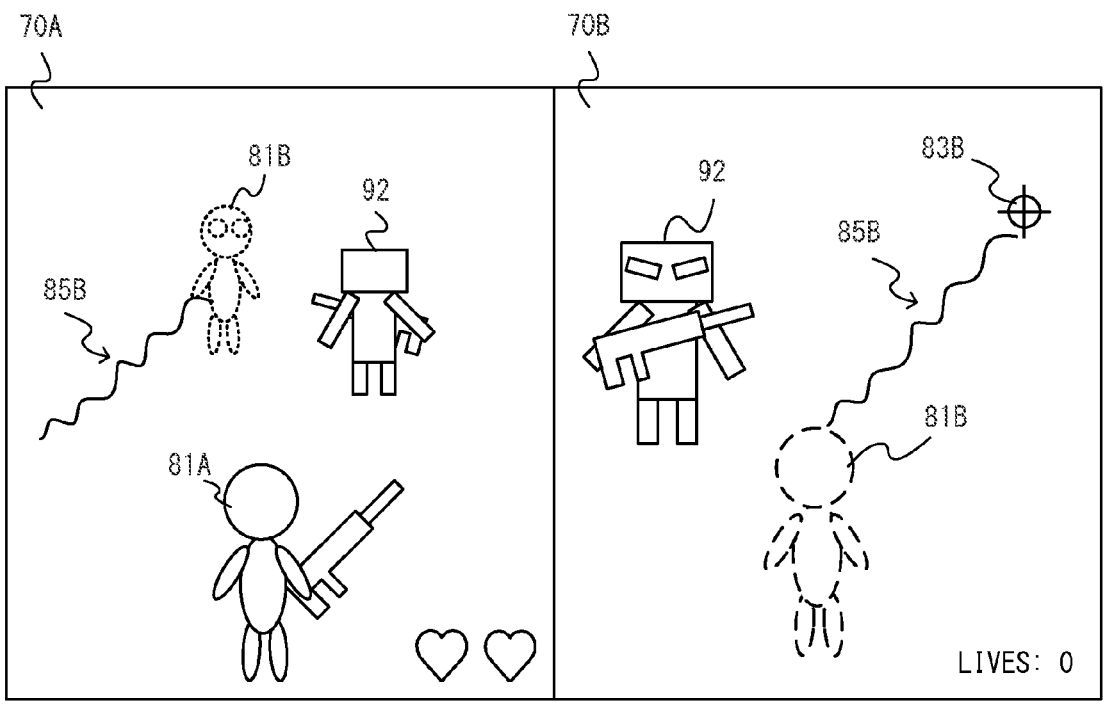
FIG. 9B is a diagram showing a non-limiting example of a game image when the player character 81B in the incapable-of-attack state has generated an electrical wave.

FIG. 9A is a diagram showing an example of a game image when the number of the lives of the player character 81B has become 0 and the player character 81B has entered the incapable-of-attack state. FIG. 9B is a diagram showing an example of a game image when the player character 81B in the incapable-of-attack state has generated an electrical wave. As shown in FIG. 9A, the player character 81B in the incapable-of-attack state is displayed in a form that enables the players to recognize the incapable-of-attack state of the player character 81B at a glance. For example, the player character 81B in the incapable-of-attack state does not hold the gun object 82B, and is also displayed in a display form different from that of the state of being capable of making an attack (the state where the number of the lives is one or greater). If the player B presses the operation button of the controller 20B (the operation button for making an attack), an image 85B is displayed that represents, as shown in FIG. 9B, that the player character 81B has generated an electrical wave. The image 85B is an image having a wave-like shape so as to represent the state of a wave propagating from the player character 81B toward the aim 83B. The players operating the other player characters can know, from the image 85B, in which direction the player character 81 in the incapable-of-attack state is present. This enables the other player characters to move to the position of the player character 81 in the incapable-of-attack state, and give a life to the player character 81 in the incapable-of-attack state. Further, by generating an electrical wave, the player character 81 in the incapable-of-attack state can also inform the players operating the other player characters of the positions of the enemy characters.

It should be noted that the condition under which each player character 81 enters the incapable-of-attack state is not limited to the number of their lives being 0. The player character 81 may enter the incapable-of-attack state if the number of their lives becomes a predetermined value or less.

As described above, in the exemplary embodiment, if one of the player characters 81 is attacked by another one of the player characters 81 on the friend team, the life item 84 appears. If the player character 81 acquires the life item 84, a life of the player character 81 is restored. Consequently, even if one of the player characters has accidentally attacked another one of the player characters on the friend team, the attacked player character can restore a life. Thus, in a game that a plurality of players cooperate to perform, it is possible to enjoy the game while cooperating with each other by various methods.

That is, in a game where a plurality of players cooperate to defeat enemies, if a player character has accidentally attacked another player character on the friend team, it is possible to either treat the attack of a player character on the friend team in a similar manner to that of an enemy by simply reducing the lives of the attacked player character, or neglect the attack of a player character on the friend team without reducing the lives of the attacked player character. For example, if a player character has been attacked by another player character on the friend team and the lives of the attacked player character simply decrease, the player operating the attacked player character has a feeling of discomfort, and the player operating the player character having made the attack may be too considerate to the player operating the attacked player character to enjoy the game. In the game according to the exemplary embodiment, however, if one of the player characters 81 is attacked by another one of the player characters 81 on the friend team, the life item 84 appears. Thus, the player character 81 attacked by the other player character on the friend team can restore a life by acquiring the life item 84. Consequently, the player operating the attacked player character does not have a feeling of discomfort, and the player operating the player character having made the attack does not need to be considerate to the player operating the attacked player character either because the attacked player character can restore a life. Further, a player intentionally allows another player character on the friend team to shoot their player character, and thereby can give a life to the other player character on the friend team. It is possible to give a life to another player character on the friend team having a small number of lives, which makes it possible to enjoy the game while cooperating with other players by helping each other.

In a game where a plurality of players cooperate to defeat enemies, an attack for defeating the enemies may hit another player character on the friend team. Thus, if the lives of the attacked player character are simply reduced by treating the attack of a player character on the friend team in a similar manner to that of an enemy, it may not be possible to enjoy the game as described above. Further, if the attack of a player character on the friend team is neglected so as not to affect any lives, each player may concentrate only on attacking the enemies, which may make the game monotonous. In the game according to the above embodiment, however, if a player character is attacked by another player character on the friend team, the lives of the attacked player character are reduced, and the life item 84 for restoring a life is also caused to appear. This makes it possible to provide an environment that facilitates the cooperation of the players. This enables the players not only to attack the enemies, but also to advance the game while considering a strategy for the friend team to win, taking into account an attack on the other player characters on the friend team as well. By giving the players more options, it is possible to allow a latitude in the advancement of a game that a plurality of players cooperate to perform.

In addition, in the above embodiment, if one of the player players 81 is attacked by another one of the player players 81 on the friend team, the life item 84 appears, and the attacked player character 81 can itself move to acquire the life item 84. This enables the attacked player character to itself restore a life. Further, in the above embodiment, the life item 84 is caused to appear at the position where the player character 81 has been attacked, which enables the attacked player character 81 to immediately restore a life. Further, the other player characters 81 can continuously perform the game in order to defeat the enemy characters 95.

In addition, in the above embodiment, any one of the player characters 81 whose lives have become 0 and which has entered the incapable-of-attack state is not only simply ejected from the game of defeating the enemies, but also capable of generating an electrical wave. This makes it possible to inform the players operating the other player characters of the positions of the enemy characters 95, and inform the other players of the position of the player character 81 itself. Further, it may be possible to inform the other players of the positions of predetermined items. For example, items for attacking the enemy characters 95 may be placed in the game space. Then, the player character 81 in the incapable-of-attack state may inform the other players of the positions of the items by generating electrical waves, and thereby can cooperate with the other players so that the friend team can win.

It should be noted that the above embodiment is merely illustrative, and, for example, may be modified in various manners as described below.

For example, in the above embodiment, the assumed game is where the player characters operated by the respective players form the friend team, and the friend team attempts to defeat the enemy characters (CPU characters) controlled by the game apparatus 10. Alternatively, in another embodiment, the game may be where a team formed of a plurality of player characters competes against a team formed of a plurality of other player characters. In this case, three or more teams may be formed, so that one may compete against another.

Figure 10:
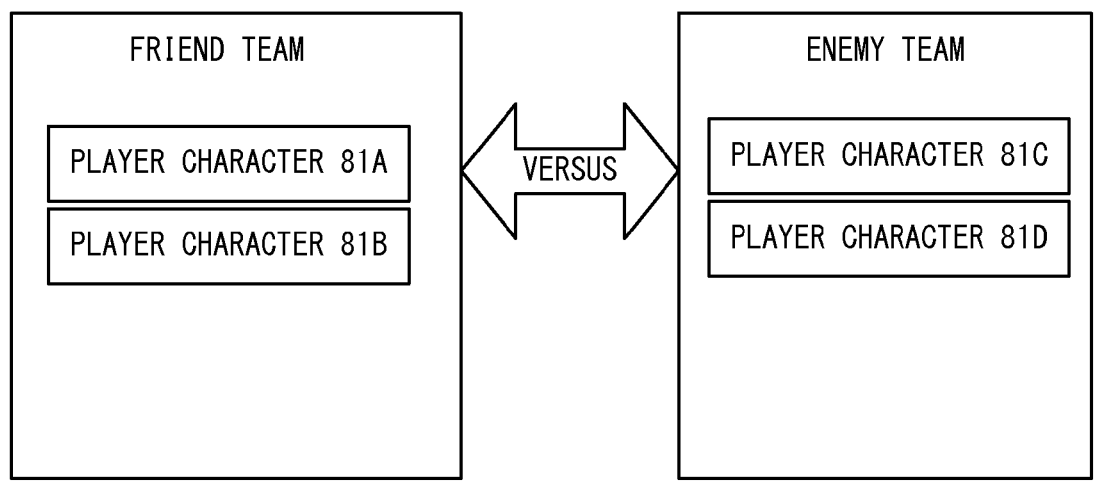
FIG. 10 is a diagram showing a non-limiting example of a versus game performed between a friend team formed of a plurality of player characters and an enemy team formed of a plurality of other player characters.

FIG. 10 is a diagram showing a versus game performed by a friend team formed of a plurality of player characters and an enemy team formed of a plurality of other player characters. As shown in FIG. 10, for example, a team (a friend team) is formed of the player character 81A operated by the player A and the player character 81B operated by the player B. Further, another team (an enemy team) is formed of the player character 81C operated by the player C and the player character 81D operated by the player D. Then, these teams perform a versus game. In this case, for example, if the player character 81A shoots the player character 81B, a life of the player character 81B decreases, and the life item 84 described above also appears in the game space. Similarly, if the player character 81C shoots the player character 81D, a life of the player character 81D decreases, and the life item 84 described above also appears in the game space. On the other hand, if, for example, the player character 81A shoots the player character 81C on the enemy team, a life of the player character 81C decreases, but the life item 84 does not appear.

In addition, in the above embodiment, the life item 84 can be acquired by all the player characters 81 on the friend team, and a life of the player character 81 having acquired the life item 84 is restored. Alternatively, in another embodiment, when only some of the player characters 81 on the friend team have acquired the life item 84, a life of the player character 81 having acquired the life item 84 may be restored. For example, only one of the player characters 81 attacked by another one of the player characters 81 on the friend team may be able to acquire the life item 84, and a life of the attacked player character 81 may be restored in accordance with the acquisition of the life item 84.

In addition, in the above embodiment, the lives of each player character 81 are represented by three steps, so that, if the player character 81 is attacked by one of the enemy characters 95 or another one of the player characters 81 on the friend team, the lives of the player character 81 are reduced by one. Alternatively, in another embodiment, the initial lives of each player character 81 may not only be represented by three steps, but also have any value. Further, a life that decreases in accordance with the attack of the enemy character 95 may have any value. For example, a predetermined life point (a hit point; a value ranging from 0 to 100, for example) may be set as the lives of each player character 81, and the value of the life point that decreases may vary depending on the type of the attack of the enemy character 95. Further, the value of the lives restored in accordance with the acquisition of the life item 84 may not necessarily be the same as the value of the lives that decreases when the player character has been attacked.

In addition, in the above embodiment, the lives of each player character 81 are represented by a plurality of steps. Alternatively, in another embodiment, the life of each player character 81 may be either 0 or 1. In this case, the life of the player character 81 is initially set to 1. For example, if the player character 81A is attacked by one of the enemy characters 95, the life of the player character 81A becomes 0, and the player character 81A enters the incapable-of-attack state. Meanwhile, the lives of other player characters, namely the player characters 81B and 81C, are 1, and therefore, the player characters 81B and 81C are in the state of being capable of making an attack. In this case, if the player character 81C attacks the player character 81B on the friend team, the life of the player character 81B becomes 0, the player character 81B enters the incapable-of-attack state, and the life item 84 also appears. Then, the player character 81A in the incapable-of-attack state acquires the life item 84, whereby the life of the player character 81A becomes 1, and the player character 81A enters the state of being capable of making an attack. For example, if the player character 81A and the player character 81B are capable of making different types of attacks, it is possible to perform a game that places more importance on teamwork. That is, a player character thus gives one life to another player character, whereby the player C can cause the player A, instead of the player B, to make an attack that can be made only by the player A. Thus, the team can select a more effective attack to attack the enemy characters.

In addition, in the above embodiment, if the lives of all the members of the friend team become 0, the friend team loses. Alternatively, in another embodiment, the condition under which the friend team loses may be any condition. For example, the friend team may lose under the condition that the lives of any one of the player characters 81 on the friend team being 1 have become 0. Alternatively, the friend team may lose under the condition that the number of the player characters 81 whose lives are 0 have become a predetermined number. Yet alternatively, for example, the friend team may lose under the condition that the lives of a particular character on the friend team have become 0. Yet alternatively, a time limit may be set in advance, so that victory or defeat may be determined on the basis of the numbers of the lives of the player characters 81 on the friend team when the time limit is reached.

In addition, in the above embodiment, if one of the player characters 81 is attacked by another one of the player characters 81 on the friend team, the life item 84 for restoring a life is caused to appear in the game space. Alternatively, in another embodiment, if one of the player characters 81 is subjected to a predetermined operation of another one of the player characters on the friend team, not only the above lives but also a predetermined parameter may be reduced (or increased), and an item for restoring the parameter (making a change opposite to that made when the player character 81 has been subjected to the predetermined operation) may be caused to appear in the game space. For example, a game may be performed where each player character has a predetermined parameter (for example, a parameter for making a special attack), and the progression of the game depends on the predetermined parameter. For example, when the predetermined parameter has become a certain value or greater (or less), the special attack can be made. If one of the player characters is subjected to a predetermined operation of one of the enemy characters, the predetermined parameter decreases (or increases). If one of the player characters is subjected to a predetermined operation of another one of the player characters on the friend team, the predetermined parameter of the player character is reduced (or increased), and an item for restoring the parameter is also caused to appear in the game space. Then, if the player character acquires the item, the predetermined parameter is restored.

In addition, in the above embodiment, an attack is made on the enemy characters 95 by pointing to a position on the screen using each controller 20. The pointing to a position on the screen may be performed by any other method. For example, an aim 83 may be moved in accordance with the direction indicated using a direction indication section (a directional pad, an analog stick, or the like) included in the controller 20 or another input apparatus, and then, an attack may be made on the position pointed to (indicated) using the aim 83. Alternatively, a touch panel may be provided on the screen, a position on the screen may be indicated by a touch operation, and then, an attack may be made on a position, in the game space, based on the indicated position. Alternatively, a position on the screen may be pointed to with a pointing device such as a mouse, and then, an attack may be made on a position, in the game space, based on the position pointed to. Then, if any one of the enemy characters or any one of the player characters on the friend team is present at the position on which the attack has been made, the attack is successful.

In addition, in the above embodiment, an attack is made on the enemy characters by firing a bullet at the position pointed to. Alternatively, in another embodiment, the attack is not limited to firing a bullet, and may be any attack so long as it is an attack of launching a predetermined object to the position pointed to. For example, the attack may be made on a position away from the player character, using a ball, a bombshell, a boomerang, an arrow, or the like. Alternatively, in another embodiment, the attack to be made by the player character is not limited to an attack of launching a predetermined object to the position pointed to, and may be any other type of attack (for example, an attack using a sword).

(Details of Game Processing)

Figure 11:
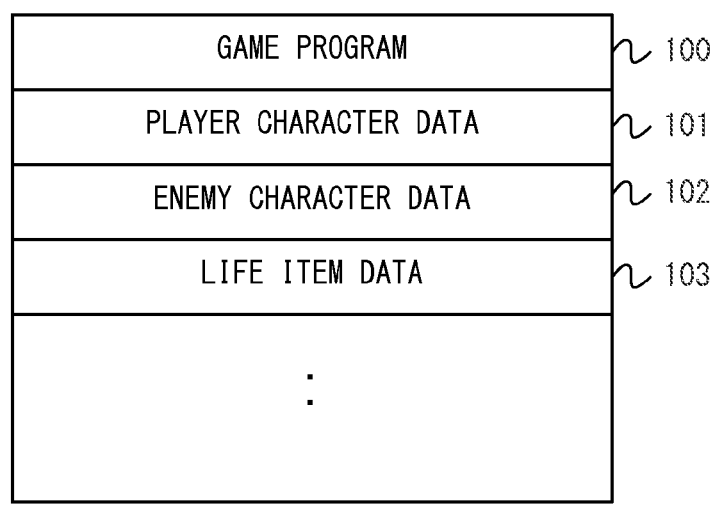
FIG. 11 is a diagram showing a non-limiting example of various data stored in the game apparatus 10.

Next, a description is given of details of the game processing performed by the game system 1 according to the exemplary embodiment. First, a description is given of various data used in the game processing. FIG. 11 is a diagram showing various data stored in the game apparatus 10.

As shown in FIG. 11, a memory of the game apparatus 10 (the memory in the information processing section 12) includes a game program 100, player character data 101, enemy character data 102, and life item data 103.

The game program 100 is a program for performing the game processing according to the exemplary embodiment. The game program 100 is loaded from the external storage medium 40 and stored in the memory.

The player character data 101 includes various information of each player character 81 (the position and the direction of the player character 81 in the game space, the number of the current lives of the player character 81, the maximum number of the lives of the player character 81, the position of the aim 83, and the like). In the player character data 101, the above information is stored for each player character.

The enemy character data 102 includes various information of each enemy character 95 (the position and the direction of the enemy character 95, the number of the current lives of the enemy character 95, the position of making an attack, and the like).

The life item data 103 includes the position of each life item 84, the time elapsed since the appearance of the life item 84, and the like. The position and the elapsed time are stored for each life item. If no life item 84 is present in the game space, data indicating the absence of life items is stored in the life item data 103.

(Descriptions of Flow Charts)

Figure 12:
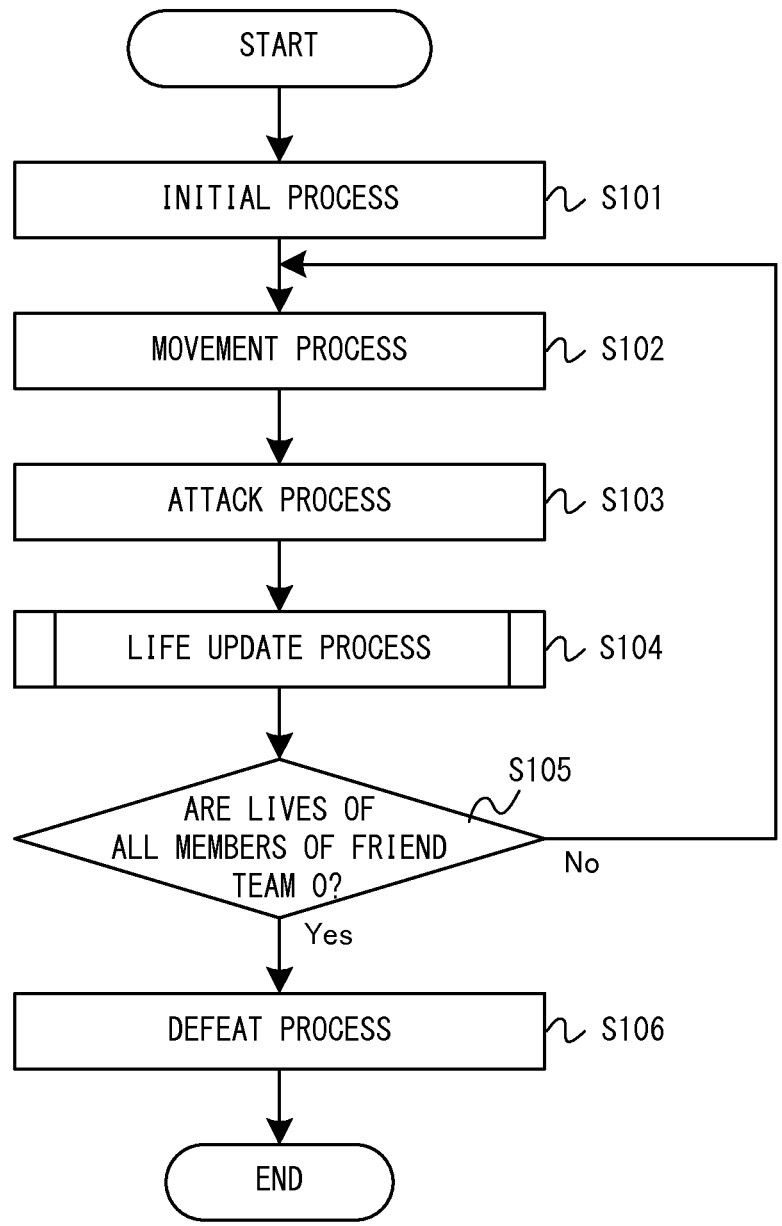
FIG. 12 is a main flow chart showing a non-limiting example of the flow of the game processing performed by the game apparatus 10.

Next, with reference to FIGS. 12 and 13, a description is given of details of the game processing performed by the game apparatus 10. FIG. 12 is a main flow chart showing the flow of the game processing performed by the game apparatus 10.

The information processing section 12 performs an initial process (step S101). In the initial process, for example, the player characters 81 are placed at predetermined positions in the game space, and the enemy characters 95 are placed at predetermined positions in the game space. Further, the number of the lives of each player character 81 is set to the maximum value (for example, three).

Subsequently, the information processing section 12 performs a movement process (step S102). In the movement process, for example, the position of each player character 81 is updated on the basis of the operation data from the corresponding controller 20, and the position of each enemy character 95 is updated in accordance with a predetermined algorithm.

Next, the information processing section 12 performs an attack process (step S103). In the attack process, if the operation button of each controller 20 for firing a bullet has been pressed, a bullet is fired into the game space. Here, the position of each aim 83 is calculated on the basis of the operation data from the corresponding controller 20, and a bullet is fired at the calculated position, in the game space, indicated by the aim 83. It should be noted that, even when the operation button of each controller 20 has been pressed, a bullet is not fired if the player character 81 operated by the controller 20 is set to the incapable-of-attack state. In this case, the information processing section 12 generates an electrical wave, instead of firing a bullet (see FIG. 9B). Further, in the attack process, the enemy characters 95 also make attacks on the player characters 81.

Next, the information processing section 12 performs a life update process (step S104). With reference to FIG. 13, details of the life update process are described below. FIG. 13 is a flow chart showing a detailed flow of the life update process (step S104) shown in FIG. 12.

First, the information processing section 12 determines whether or not a bullet fired by any one of the player characters 81 has hit any one of the enemy characters 95 (step S110). If the determination result is positive, the information processing section 12 next performs the process of step S111. If the determination result is negative, the information processing section 12 next performs the process of step S112.

In step S111, the information processing section 12 reduces, by one, the lives of the enemy character 95 hit by the bullet. The information processing section 12 next performs the process of step S112. It should be noted that, if the enemy character 95 has fallen down (the lives of the enemy character 95 have become 0) and the number of the enemy characters 95 existing in the game space becomes 0 in step S111, the friend team (the team of the player characters 81) wins, and the processing shown in FIGS. 12 and 13 ends.

In step S112, the information processing section 12 determines whether or not a bullet has hit any one of the player characters 81 on the friend team. If the determination result is positive, the information processing section 12 next performs the process of step S113. If the determination result is negative, the information processing section 12 next performs the process of step S118.

In step S113, the information processing section 12 determines whether or not the player character 81 hit by the bullet has been shot by another one of the player characters 81 on the friend team. If the determination result is positive, the information processing section 12 next performs the process of step S114. If the determination result is negative, the information processing section 12 next performs the process of step S115.

In step S114, the information processing section 12 causes a life item 84 to appear in the game space. Specifically, the information processing section 12 causes the life item 84 to appear at the position of the player character 81 hit by the bullet. It should be noted that the information processing section 12 causes the life item 84 to appear, and also starts to measure the time elapsed since the appearance of the life item 84. If the elapsed time becomes a predetermined time, the information processing section 12 causes the life item 84 to disappear. The information processing section 12 next performs the process of step S115.

In step S115, the information processing section 12 reduces the lives of the player character 81 hit by the bullet. At this time, the information processing section 12 causes an image, indicating that the bullet has hit the player character 81 (see FIGS. 4B and 5B), to be displayed on the display section 30. The information processing section 12 next performs the process of step S116.

In step S116, the information processing section 12 determines whether or not the number of the remaining lives of the player character 81 hit by the bullet is 0. If the determination result is positive, the information processing section 12 next performs the process of step S117. If the determination result is negative, the information processing section 12 ends the life update process.

In step S117, the information processing section 12 sets the player character 81 the number of whose lives is 0 to the incapable-of-attack state, and ends the life update process.

On the other hand, in step S118, the information processing section 12 determines whether or not any one of the player characters 81 has acquired a life item 84. Specifically, if the position of any one of the player characters 81 and the position of a life item 84 are included in a predetermined range, the information processing section 12 determines that the player character 81 has acquired the life item 84. If the determination result is positive, the information processing section 12 next performs the process of step S119. If the determination result is negative, the information processing section 12 ends the life update process.

In step S119, the information processing section 12 determines whether or not the number of the current lives of the player character 81 having acquired the life item 84 is the maximum value determined in advance (for example, three). If the determination result is positive, the information processing section 12 ends the life update process. If the determination result is negative, the information processing section 12 next performs the process of step S120.

In step S120, the information processing section 12 increases, by one, the lives of the player character 81 having acquired the life item 84, and ends the life update process.

Referring back to FIG. 12, after the process of step S104, the information processing section 12 determines whether or not the lives of all the members of the friend team have become 0 (step S105). Specifically, with reference to the memory, the information processing section 12 determines whether or not the numbers of the lives of all the player characters 81 have become 0. If the determination result is positive, the information processing section 12 next performs the process of step S106. If the determination result is negative, the information processing section 12 performs the process of step S102 again.

In step S106, the information processing section 12 performs a defeat process. The defeat process is the process of causing the friend team to lose because the numbers of the lives of all the members of the friend team (all the player characters 81) have become 0. Specifically, the information processing section 12 causes an image, indicating that the friend team has lost, to be displayed on the display section 30. This is the end of the game processing.

It should be noted that the processes of all the steps in the flow charts shown in FIGS. 12 and 13 are merely illustrative. Thus, the processing order of the steps may be changed so long as similar results are obtained. Further, the values set in the game processing and the values used for the determinations are merely illustrative, and therefore, other values may be used.

In addition, the game program may be executed not only by the game apparatus 10 described above, but also by any other information processing apparatus, and the other information processing apparatus may function as the game system described above. Possible examples of the other information processing apparatus include mobile phones, smartphones, PDAs, personal computers, tablet computers, and the like.

Alternatively, in another embodiment, in a game system including a plurality of apparatuses capable of communicating with each other, the plurality of apparatuses may share the execution of the game processing performed by the game apparatus 10 as described above. For example, the game system as described above may include a plurality of information processing apparatuses connected to a network such as the Internet.

In addition, in the above embodiment, the processing indicated in the flow chart described above is performed as a result of the information processing section 12 of the game apparatus 10 executing the game program. Alternatively, in another embodiment, some or all of the processing described above may be performed by a dedicated circuit included in the game apparatus 10, or may be performed by a general-purpose processor other than the dedicated circuit. At least one processor may operate as a "programmed logic circuit" for performing the processing described above.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A game system for executing a game played by a plurality of players, the game system comprising:
    a player object setting unit for setting, for each player, a player object to be operated by the player;
    a friend setting unit for setting a friend team including a plurality of player objects among the player objects;
    an enemy setting unit for setting an enemy object that serves as an enemy of the friend team;
    a life setting unit for setting a life for each player object; and
    a game processing unit for performing game processing in a virtual space on the basis of operations of the players, the game processing unit including:
    a movement process unit for, in accordance with an operation of each player, causing the corresponding player object to move;
    an attack execution unit for, in accordance with an operation of the player, causing the player object to make an attack;
    a first damage process unit for damaging the enemy object in accordance with an attack made on the enemy object by the player object;
    a second damage process unit for performing subtraction on the life of the player object in accordance with an attack made on the player object by the enemy object;
    a friend attack process unit for, when a player object which is a member of the friend team and which is different than said player object operated by the player, said player object operated by the player also being a member of the friend team has attacked said player object, performing subtraction on the life of the attacked player object, and causing a restoration object for restoring the life to appear in the virtual space; and
    a restoration process unit for, when any one of the player objects on the friend team has acquired the restoration object in accordance with an operation of the player operating said any one of the player objects, restoring the life of the player object having acquired the restoration object.

2. The game system according to claim 1, wherein when the player object attacked by the other player object on the friend team has acquired the restoration object, the restoration process unit restores the life of the player object.

3. The game system according to claim 1, wherein the game processing unit further includes:
    a state change unit for, when the life of the player object has become a predetermined value or less, changing a state of the player object to an incapable-of-attack state where the movement process unit is capable of causing the player object to move, but the attack execution unit is incapable of causing the player object to make an attack; and
    a recovery process unit for, when the player object in the incapable-of-attack state has acquired the restoration object, restoring the life and recovering the player object to a state where the attack execution unit is capable of causing the player object to make an attack.

4. The game system according to claim 3, wherein the game processing unit further includes an object generation unit for, when the player object is in the incapable-of-attack state, generating a predetermined object from the player object.

5. The game system according to claim 1, wherein the friend attack process unit causes the restoration object to appear at a position, in the virtual space, determined on the basis of the attacked player object.

6. The game system according to claim 1, wherein the game processing unit further includes a defeat process unit for, when the lives of the player objects on the friend team have satisfied a predetermined condition, determining a defeat of the friend team.

7. The game system according to claim 1, wherein all the player objects belong to the friend team, and the enemy object is automatically controlled by the game system.

8. The game system according to claim 1, wherein the attack execution unit causes the player object to make an attack on a position pointed to in accordance with the operation of the player.

9. The game system according to claim 1, wherein the friend setting unit divides the player objects into a plurality of teams so as to set at least one friend team and at least one enemy team, and the player objects on the enemy team serve as the enemy object.

10. A game processing method to be performed by a game system capable of executing a game played by a plurality of players, the game processing method comprising:
    player object setting for setting, for each player, a player object to be operated by the player;
    friend setting for setting a friend team including a plurality of player objects among the player objects;
    enemy setting for setting an enemy object that serves as an enemy of the friend team;
    life setting for setting a life for each player object; and
    performing game processing in a virtual space on the basis of operations of the players,
    the performing game processing including:
    a movement process for, in accordance with an operation of each player, causing the corresponding player object to move;
    an attack execution for, in accordance with an operation of the player, causing the player object to make an attack;
    a first damage process for damaging the enemy object in accordance with an attack made on the enemy object by the player object;
    a second damage process for performing subtraction on the life of the player object in accordance with an attack made on the player object by the enemy object;

a friend attack process for, when a player object which is a member of the friend team and which is different than said player object operated by the player, said player object operated by the player also being a member of the friend team has attacked said player object, performing subtraction on the life of the attacked player object, and causing a restoration object for restoring the life to appear in the virtual space; and a restoration process for, when any one of the player objects on the friend team has acquired the restoration object in accordance with an operation of the player operating said any one of the player objects, restoring the life of the player object having acquired the restoration object.

11. The game processing method according to claim 10, wherein
when the player object attacked by the other player object on the friend team has acquired the restoration object, the life of the player object is restored in the restoration process.

12. The game processing method according to claim 10, wherein
the performing game processing further includes:
a state change for, when the life of the player object has become a predetermined value or less, changing a state of the player object to an incapable-of-attack state where the player object is capable of being caused to move in the movement process, but is incapable of being caused to make an attack in the attack execution; and
a recovery process for, when the player object in the incapable-of-attack state has acquired the restoration object, restoring the life and recovering the player object to a state where the player object is capable of being caused to make an attack in the attack execution.

13. The game processing method according to claim 12, wherein
the performing game processing further includes
an object generation for, when the player object is in the incapable-of-attack state, generating a predetermined object from the player object.

14. The game processing method according to claim 10, wherein
in the friend attack process, the restoration object is caused to appear at a position, in the virtual space, determined on the basis of the attacked player object.

15. The game processing method according to claim 10, wherein
the performing game processing further includes
a defeat process for, when the lives of the player objects on the friend team have satisfied a predetermined condition, determining a defeat of the friend team.

16. The game processing method according to claim 10, wherein
all the player objects belong to the friend team, and the enemy object is automatically controlled by the game processing method.

17. The game processing method according to claim 10, wherein
in the attack execution, the player object is caused to make an attack on a position pointed to in accordance with the operation of the player.

18. The game processing method according to claim 10, wherein
in the friend setting, the player objects are divided into a plurality of teams so as to set at least one friend team and at least one enemy team, and
the player objects on the enemy team serve as the enemy object.

19. A non-transitory computer-readable storage medium having stored therein a game program to be executed by at least one processor included in a game system for executing a game played by a plurality of players, the game program causing the processor to execute:
setting, for each player, a player object to be operated by the player;
setting a friend team including a plurality of player objects among the player objects;
setting an enemy object that serves as an enemy of the friend team;
setting a life for each player object;
performing game processing in a virtual space on the basis of operations of the players,
causing, in accordance with an operation of each player, the corresponding player object to move;
causing, in accordance with an operation of the player, the player object to make an attack;
damaging the enemy object in accordance with an attack made on the enemy object by the player object;
performing subtraction on the life of the player object in accordance with an attack made on the player object by the enemy object;
performing, when a player object which is a member of the friend team and which is different than said player object operated by the player, said player object operated by the player also being a member of the friend team has attacked said player object, subtraction on the life of the attacked player object, and causing a restoration object for restoring the life to appear in the virtual space; and
restoring, when any one of the player objects on the friend team has acquired the restoration object in accordance with an operation of the player operating said any one of the player objects, the life of the player object having acquired the restoration object.

20. A game apparatus for executing a game played by a plurality of players, the game apparatus comprising:
a player object setting unit for setting, for each player, a player object to be operated by the player;
a friend setting unit for setting a friend team including a plurality of player objects among the player objects;
an enemy setting unit for setting an enemy object that serves as an enemy of the friend team;
a life setting unit for setting a life for each player object; and
a game processing unit for performing game processing in a virtual space on the basis of operations of the players,
the game processing unit including:
a movement process unit for, in accordance with an operation of each player, causing the corresponding player object to move;
an attack execution unit for, in accordance with an operation of the player, causing the player object to make an attack;
a first damage process unit for damaging the enemy object in accordance with an attack made on the enemy object by the player object;
a second damage process unit for performing subtraction on the life of the player object in accordance with an attack made on the player object by the enemy object;
a friend attack process unit for, when a player object which is a member of the friend team and which is different than said player object operated by the player, said player object operated by the player also being a member of the friend team has attacked said player object, performing subtraction on the life of the attacked player object, and causing a restoration object for restoring the life to appear in the virtual space; and a restoration process unit for, when any one of the player objects on the friend team has acquired the restoration object in accordance with an operation of the player operating said any one of the player objects, restoring the life of the player object having acquired the restoration object.

21. A game system for executing a game played by a plurality of players, the game system comprising:

a player object setting unit for setting, for each player, a player object to be operated by the player;

a friend setting unit for setting a friend team including a plurality of player objects among the player objects;

an enemy setting unit for setting an enemy object that serves as an enemy of the friend team;

a parameter setting unit for setting a predetermined parameter for each player object; and a game processing unit for performing game processing in a virtual space on the basis of operations of the players, the game processing unit including:

a movement process unit for, in accordance with an operation of each player, causing the corresponding player object to move;

an action execution unit for, in accordance with an operation of the player, causing the player object to take a predetermined action;

a determination unit for determining whether or not the predetermined action of the player object based on the action execution unit has been taken on the enemy object or another one of the player objects;

a first parameter process unit for changing a predetermined parameter of the enemy object in accordance with the predetermined action of the player object taken on the enemy object;

a second parameter process unit for changing the predetermined parameter of the player object in accordance with a predetermined action of the enemy object taken on the player object;

a friend action process unit for, when a player object which is a member of the friend team and which is different than said player object operated by the player, said player object operated by the player also being a member of the friend team has taken said predetermined action on the player object, changing the predetermined parameter of the player object on which the predetermined action has been taken, and causing a restoration object for restoring the predetermined parameter to appear in the virtual space; and a restoration process unit for, when any one of the player objects on the friend team has acquired the restoration object in accordance with an operation of the player operating said any one of the player objects, restoring the predetermined parameter of the player object having acquired the restoration object.

* * * * *